United States Patent [19]

Limpson, Jr. et al.

[11] 3,851,888
[45] Dec. 3, 1974

[54] MACHINERY SEAL

[76] Inventors: Alma A. Limpson, Jr., 4122 Kestrel, Salt Lake City, Utah 84120; Gordon T. Zitting, 2136 E. 8200 South, Sandy, Utah 84070

[22] Filed: Mar. 21, 1973

[21] Appl. No.: 343,324

[52] U.S. Cl.............................. 277/206, 277/165
[51] Int. Cl............................................ F16j 15/32
[58] Field of Search ........ 277/205, 206, 206.1, 124, 277/188, 212 C, 211, 164, 165; 285/DIG. 19; 251/DIG. 1

[56] References Cited
UNITED STATES PATENTS

| | | | |
|---|---|---|---|
| 2,979,350 | 4/1961 | Lansky............................. | 277/205 |
| 3,169,776 | 2/1965 | Felt................................... | 277/125 |
| 3,342,500 | 9/1967 | Knudson........................... | 277/125 |
| 3,418,001 | 12/1968 | Rentschler et al................ | 277/165 |
| 3,563,558 | 11/1968 | Doutt................................ | 277/205 |
| 3,603,603 | 9/1971 | Woodson.......................... | 277/165 |
| 3,608,913 | 9/1971 | D'Assignies..................... | 277/165 |
| 3,738,665 | 6/1973 | Bilco................................. | 277/205 |

*Primary Examiner*—Samuel B. Rothberg
*Assistant Examiner*—Robert I. Smith
*Attorney, Agent, or Firm*—Lynn G. Foster

[57] ABSTRACT

A U-cup type of machinery seal adapted to be disposed in an annular configuration about a gland, a rotating or reciprocating shaft, or a reciprocating piston, includes an annular groove adapted to receive an elastomeric spring to bias the seal, said annular groove defining a pair of axially extending leg portions and a base portion joining said leg portions, the width of the base being less than the width of the machinery portion within which it is to be restrained, each of said leg portions having end surfaces which are sloped with respect to the side surfaces of said base portion to provide tips which extend radially inwardly and outwardly, respectively, with a total radial width between the tips which is greater than the radial width of the machinery confinement in which the seal is to be constrained. The annular groove has a transverse cross-section similar to the four-lobed, substantially flattened X-shaped cross-section of the elastomeric ring spring, the minimum internal radial cross-sectional width of said annular groove being located at least as close to the axially outward opening of said groove as said radially extending tips are, thereby to apply mechanical wedging and hydrostatic pressure from said ring seal directly to said tips. The base surface of said seal being substantially planar permits multiple usage thereof in a stacked configuration or in single usage, without altering the seal characteristics of the said base surface.

2 Claims, 3 Drawing Figures

PATENTED DEC 3 1974  3,851,888

3,851,888

MACHINERY SEAL

BACKGROUND

1. Field of Invention

This invention relates to composite machinery seals, and more particularly to an improved U-cup type of seal or boot adapted for use with an elastomeric resilient ring spring.

2. Prior Art

The use of composite seals including a generally annular seal frequently referred to as a boot or a U-cup which has an annular groove adapted to receive a resilient ring is well known. Commonly, such composite seals are adapted for use with the well known O-ring. As is known, such composite seals frequently require a large amount of pressure applied thereto in order to provide an adequate seal against the passage of fluid, which may be either a gas or a liquid. The application of high pressure causes the U-cup seal to inflict damage upon the resilient ring, and causes excessive wear of both the U-cup seal and the ring. In some prior art configurations, the U-cup seal has been provided with a base surface (the surface opposite to the annular groove therein) shaped to mate with the spring of an adjacently disposed composite seal so as to allow usage of multiple seals in forming a packing (similar to the well known V packing). However, shaping the base surface so as to provide complementary mating with an adjacent ring causes the U-cup seal or boot to be distorted in a fashion which hampers provision of its proper pressure so that the side surfaces of the U-cup seal will provide inadequate fluid sealing with the adjacent machinery surfaces, and further hampers the required distortion of the adjacent ring when used in a multiple configuration so that undesirable and nonuniform results are achieved in both the single and multiple usages thereof.

OBJECTS AND BRIEF SUMMARY OF THE INVENTION

The principal object of the present invention is to provide an improved composite seal.

Another object of the present invention is to provide a composite seal capable of improved wear characteristics for longer life.

A further object of the present invention is to provide a composite seal which exhibits improved performance in either single or multiple configurations thereof.

According to the present invention, the transverse cross-sectional configuration of an essentially U-cup seal portion or boot of a composite seal, adapted to receive an elastomeric resilient ring spring in an annular groove therein, is so shaped as to provide a relatively small surface contact area with the surrounding surfaces of the machinery for which a fluid seal is to be provided. In further accord with the presenet invention, the transverse cross-sectional configuration of a U-cup seal portion or boot of a composite seal is so configured that pressure applied to the U-cup portion, as a result of insertion therein of a resilient ring spring, and also as a result of deformation of the ring spring by pressure applied thereto as a result of clamping the composite seal within the confinements of the machinery to be sealed, is applied directly to portions of the U-cup or boot which extend radially inwardly and outwardly, when uncompressed, an amount greater than the transverse radial width of the confinement within which the seal is to work, thereby to concentrate the force on a relatively small area and thus to provide increased pressure with lower force.

The present invention permits achieving a desired quality of fluid seal with less force than that known to the prior art. The use of less force reduces wear, thereby greatly enhancing the useful lifetime of a composite seal in accordance with the present invention. Provision of a base seal portion which has less radial extent than the tip portions which provide the seal, not only allows use of a lower force for a given quality of seal, but also automatically provides for improved wear compensation characteristics. Provision of a base surface which is substantially planar provides for usage of the composite seal in accordance herewith in either multiple or individual configurations without sacrificing the desired sealing characteristics as the base portion is applied to a surface of the machinery in a single configuration, and without sacrificing the desired distortion of the resilient ring spring of an adjacent composite seal, when used in a multiple configuration. The present invention may be readily implemented utilizing materials and techniques which are well known to those skilled in the art. The advantages of the present invention may be achieved with no increase in cost over similar devices known to the art.

Other objects, features and advantanges of the present invention will become more apparent in light of the following detailed description of a preferred embodiment thereof, as illustrated in the accompanying drawings.

DESCRIPTION OF THE PREFERRED EMBODIMENT

Figure 1:
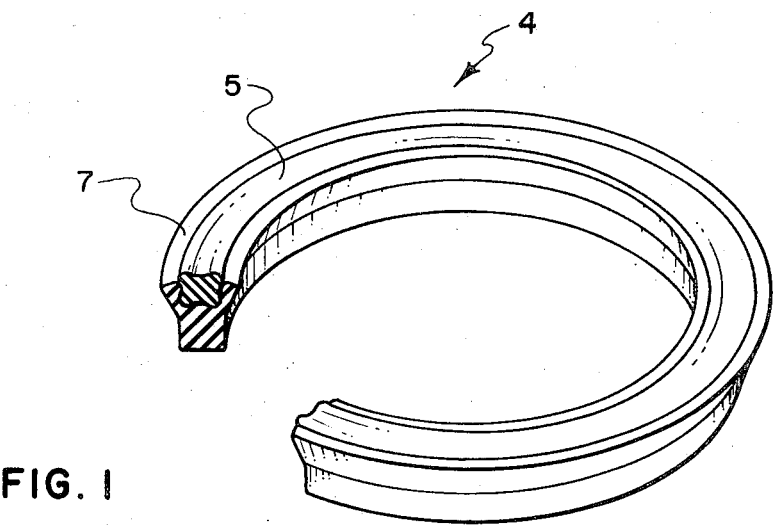
FIG. 1 is a partially broken away perspective of a composite seal in accordance with the present invention.
Figure 2:
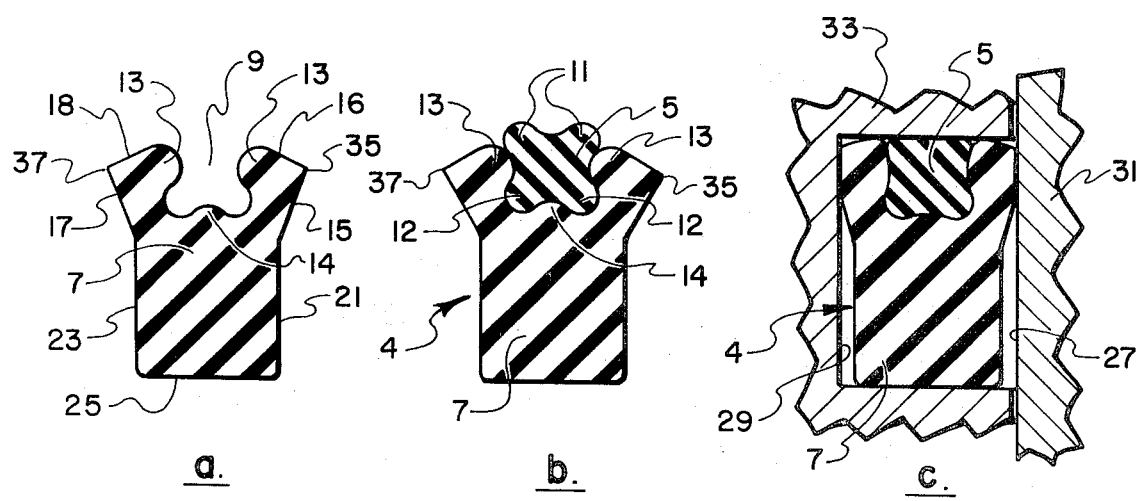
FIG. 2 is a series of related cross-sections of a composite seal and the improved U-cup portion thereof in accordance with the present invention.

Referring now to FIGS. 1 and 2, a composite seal structure 4 includes an elastomeric resilient ring spring 5 and an improved seal or boot portion 7, generally of a well known U-cup configuration, in accordance with the present invention. The boot 7 has an axially extending annular groove 9 formed therein, as shown most clearly in FIG. 2a. The transverse cross-sectional configuration of the resilient ring spring 5 (FIG. 2b) is generally in the shape of a flattened X, with four lobes 11, 12. This shape of resilient ring spring is known in the art and readily available in the marketplace. The annular groove 9 in the boot portion 7 has three lobes 13, 14 designed to fit inbetween the lobes 11, 12. A first feature of the present invention is that the transverse distance between the lobes 13, when the boot 7 is in its undistorted or relaxed condition as shown in FIG. 2a, is less than the minimum transverse distance across the resilient ring spring 5. Thus the groove 9 is opened slightly as a result of inserting the resilient ring spring 5 into the groove 9, as shown in FIG. 2b. Additionally, the lobes 13 are so arranged that the lobes 11 extend outwardly of the groove 9 when placed therein, as best seen in FIG. 2b. In the area surrounding annular groove 9 there is a sloped, radially inward side surface 15 and a sloped, radially inward end surface 16, a sloped, radially outward side surface 17 and a sloped, radially outward end surfaae 18. The area enclosed by the surfaces 15–18 is referred to as a bifurcated area, and the remainder is a base area bounded by a radially inward planar surface 21, a radially outward planar surface 23, and a base surface 25. The radially transverse dimension between the surfaces 21, 23 is less than the radial dimension between the adjacent surfaces 27, 29 (FIG. 2c) of those portions 31, 33 of the machinery within which the composite seal 4 is to be constrained. On the other hand, the surfaces 15, 16 and 17, 18 converge at pointed tips 35, 37 which have a radially transverse separation therebetween greater than the distance between the surfaces 27, 29 of the machinery. This is an important aspect of the present invention since it provides a relatively small surface area to respond to such radially outward forces as there are, to provide a seal between the surfaces 27 and 29; that is, by providing a smaller area, a larger pressure is exerted against the surfaces 27, 29 for a given amount of force within the composite seal 4. Since this is the case, the dimensions of the composite seal 4 may be adjusted downwardly to result in a lesser total force there within, and with lesser radially outward forces exerted against the surfaces 27, 29 there is less frictional wear which enhances the life of the seal. In a similar fashion, since less force need be generated to create suitable pressure for an adequate sealing relationship, the resilient ring spring 5 may be compressed less with the present invention than is the case in similar devices of the prior art. This naturally reduces the force between the member 33 and the surface of the resilient ring spring 5 so that it has less frictional wear and will also last longer.

A still further aspect of the present invention resides in the fact that the tips 35, 37 are disposed parallel with or below the horizontal maxima of the lobes 13 (as seen in FIG. 2) thereby tending to cause the outward pressure applied to the tips 35, 37 to be more nearly radial in nature, resulting in an improvement in the wear compensation characteristics of the seal. That is, considering the intersection of the surface 15 with the surface 21 as a hinge or fulcrum, pressure exerted by the expansion of the groove 9 and the compression of the ring spring 5 in the boot 7 will be to the right and downward from the maximum of the lobe 13. Thus by providing the maximum dimension of the tip 35 slightly below the horizontal maximum of the lobe 13, the resultant force is oriented toward the point 35 to provide maximum pressure thereat. It is to be noted that the minimum internal radial cross-sectional width of said annular groove allows the spring to apply both a mechanical wedging action and hydrostatic pressure to the seal tips 35 and 37.

Figure 3:
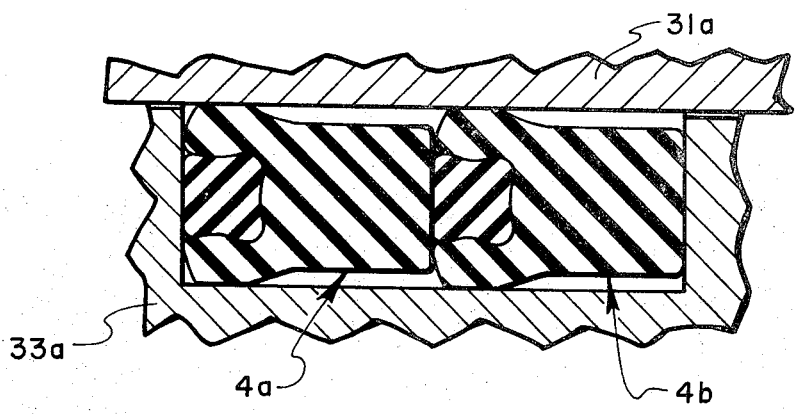
FIG. 3 is a simplified, sectioned side elevation of a multi-seal configuration of the invention.

Another feature of the present invention is illustrated in FIG. 3. By providing a substantially planar base surface 25, a plurality of composite seals 4a, 4b may be used together without providing a different compressive action in the lower seal 4b as a result of some shaping of the base surface 25 (which is used in some composite seals known to the prior art). In addition, the planar base surface 25 does not result in different stress of the base portion (defined by surfaces 21–25, FIG. 2) when a single seal is used (FIG. 2c), and in fact provides the same lack of distortion when a plurality of seals are used as illustrated in FIG. 3.

As is known in the art, the composite seal 4 in accordance with the present invention may preferably be formed of a deformable but substantially noncompressible material, which may for instance comprise rubber, neoprene, urethane, or any other suitable elastomeric or plastic material.

Although the invention has been shown and described with respect to a preferred embodiment, it should be understood to those skilled in the art that various changes and omissions in the form and detail thereof may be made therein without departing from the spirit and scope of the invention.

Having thus described a typical embodiment of our invention, that which we claim as new and desire to secure by Letters Patent is:

1. A composite seal assembly for machinery comprising: an annular elastomeric boot having an exposed annular groove and an elastomeric resilient ring spring received into the annular groove;

the boot being of one-piece construction and comprising (a) a rectangular base portion defined by substantially planar inside and outside surfaces joined one to the other by a substantially planar base surface and (b) a contiguous bifurcated portion defining said annular groove located opposite said planar base surface, said bifurcated portion having a transverse cross-section characterized by a pair of oppositely extending substantially triangular portions each comprisisng an angular tip and being disposed exterior of the annular groove and respectively bridging between one of said planar side surfaces and the annular groove, the tip-to-tip distance being essentially parallel to but substantially greater than the side surface-to-side surface distance, the surface defining the annular groove comprising opposed inwardly directed lobes extending into and defining the minimum transverse dimension across said groove, the tips and apex of the lobes being generally aligned each with the others, the transverse dimension immediately adjacent said lobes in the annular groove being substantially greater than said minimum transverse dimension;

the spring comprising opposed recesses shaped to correspond to and mate with the lobes, the distance between said recesses being greater than said minimum transverse dimension causing a spreading of the tips when the spring is placed within the annular recess in said mating relationship, the spring further comprising an exposed enlarged portion projecting outward from the annular groove beyond any part of the boot a substantial distance whereby force upon the exposed enlarged portion toward the annular groove will distort the spring filling, at least in part, the recesses and further displacing the tips away from each other by application of said filling force to the boot lobes, for improved sealing.

2. The composite seal assembly of claim 1 wherein said spring is X-shaped and comprises four ends, each said end comprising a lobe two of which comprise said exposed enlarged portion and two being normally disposed within the annular groove, said recesses being respectively located between exposed and concealed spring lobes, said annular groove being shaped to mate with said concealed spring lobes and said spring recesses.

* * * * *